United States Patent

[15] 3,638,124

Lindqvist et al.

[45] Jan. 25, 1972

[54] APPARATUS UTILIZING A TREE NETWORK FOR COMPANDING AND CODING AN ANALOG SIGNAL IN A PCM SYSTEM

[72] Inventors: Stig Gustaf Lindqvist, Enskede; Ilmar Valfeid Vaher, Bandhagen, both of Sweden

[73] Assignee: Telefonaktiebolaget LM Ericsson, Stockholm, Sweden

[22] Filed: Dec. 30, 1968

[21] Appl. No.: 787,957

[30] Foreign Application Priority Data

Jan. 18, 1968 Sweden....................................662/68

[52] U.S. Cl. ............................................325/141, 325/38 R

[51] Int. Cl. ..........................................................H04b 1/00

[58] Field of Search...................325/38.1, 38 A, 42, 43, 141, 325/38 B; 333/14; 340/347; 179/15 AP, 15 AV

[56] References Cited

UNITED STATES PATENTS 2,816,267 12/1957 de Jager et al........................325/38.1

2,897,275 7/1959 Bowers.................................325/38.1

3,151,296 9/1964 Phyfe..................................325/38.1

3,461,244 8/1969 Brolin..................................325/38.1

*Primary Examiner*—Robert L. Griffin

*Assistant Examiner*—R. S. Bell

*Attorney*—Hane & Baxley

[57] ABSTRACT

An arrangement for companding an analog signal in a pulse code modulation system, comprising a tree network having one input and a number of outputs each corresponding to a subrange of the amplitude range within which the analog signal falls. The branches of the tree network comprise amplifiers having different amplification, by means of which signals belonging to different subranges are given different amplification. The outputs of the tree network are connected to an addition circuit at the output of which an analog companded signal is obtained. The arrangement is also provided with digital outputs from which a digital value corresponding to the subrange of the analog signal is obtained.

3 Claims, 3 Drawing Figures

Figure 1:
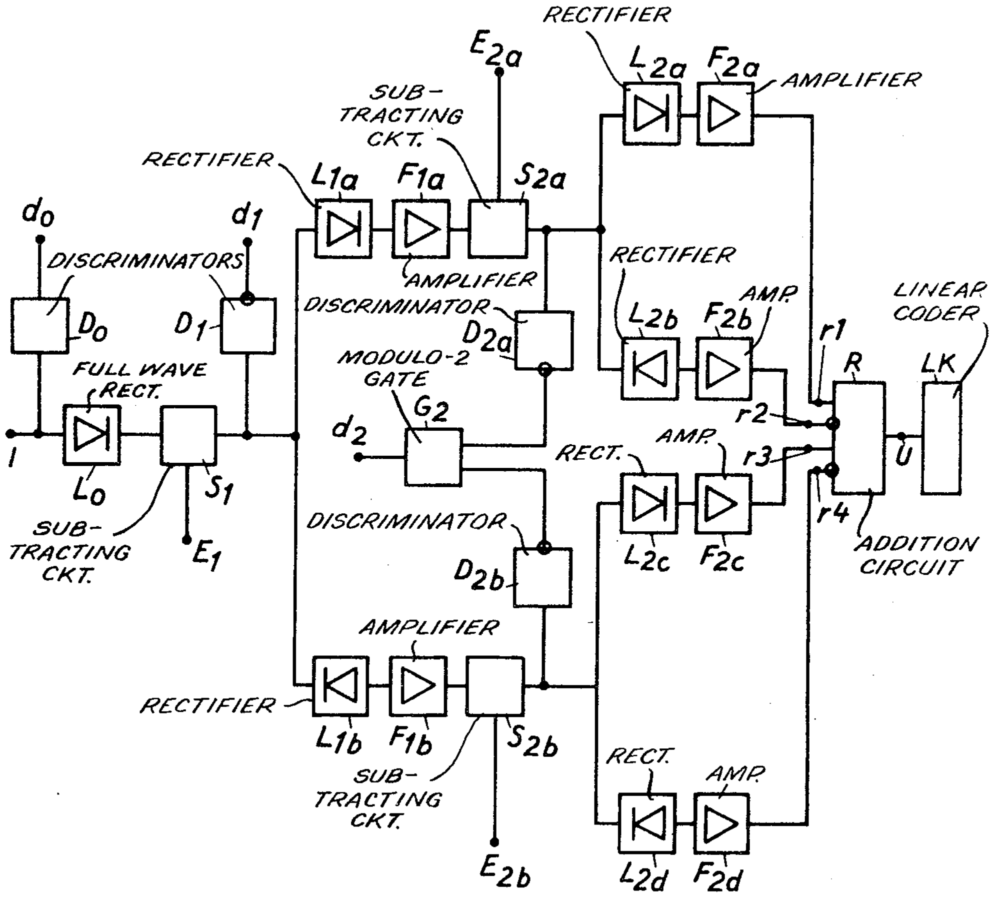

INVENTORS
STIG GUSTAF LINDQVIST
ILMAR VALFRID VAHER

BY Hane and Baxley
ATTORNEYS

| | A' | B' | C' | D' | D | C | B | A |
|---|---|---|---|---|---|---|---|---|
| $d_0$ | 0 | 0 | 0 | 0 | 1 | 1 | 1 | 1 |
| $d_1$ | 0 | 0 | 1 | 1 | 1 | 1 | 0 | 0 |
| $d_2$ | 0 | 1 | 1 | 0 | 0 | 1 | 1 | 0 |

BINARY VALUES OF DISCRIMINATOR OUTPUTS

INVENTORS

STIG GUSTAF LINDQVIST

ILMAR VALFRID VAHER

BY Hane and Baxley

ATTORNEYS

APPARATUS UTILIZING A TREE NETWORK FOR COMPANDING AND CODING AN ANALOG SIGNAL IN A PCM SYSTEM

This invention pertains to the companding and coding of an analog signal in a pulse code modulation PCM system.

When pulse code modulating an analog signal the signal is detected periodically and the amplitude of the signal is represented digitally. Since the analog signal varies continuously while the digital representation is restricted to certain discrete levels, the modulation has quantization noise. A method for reducing this noise is to make the difference between the levels that are represented digitally increase with an increasing amplitude of the analog signal, i.e., to carry out a companding of this signal. Such a companding may be carried out by means of a cascade coder (also called a stage-by-stage coder), which method is described for example in the U.S. Pat. No. 3,161,868. The coder described in this patent has however a considerable disadvantage, which is also pointed out in the specification, viz that it gives a discontinuous transfer characteristic involving a risk of very serious errors when coding signals that are close to the discontinuity points.

The present invention is therefore intended to provide an arrangement for companding and coding of the stage-by-stage type, having a continuous transfer characteristic. The arrangement comprises partly a number of subnetworks, each provided with one input and two outputs, the input of each subnetwork being connected to one output of another subnetwork in such a manner that a tree network is obtained in which the number of outputs is equal to the number of said subranges and partly an addition circuit, to the inputs of which said outputs are connected and the output of which forms the output of the arrangement. Each of said number of subnetworks comprises partly a subtracting circuit, one input of which forms the input of the network and an amplifier connected in series with a rectifier between the output of the subtracting circuit and each of the two network outputs. The rectifiers are antiparallelly connected. A discriminator is connected to the output of the subtracting circuit, the output of the discriminator forming one of said digital outputs. A direct voltage is connected to another input of the subtracting circuit in each subnetwork, said direct voltage defining a level dividing the amplitude subranges supplied to the respective network input into two groups of subranges, whereby a signal supplied to the input of the arrangement is transferred to an output in the tree network via a number of branches of said subnetworks, the branches being dependent on the amplitude subrange, and the signal obtaining an amplification forming the product of the amplification of the amplifiers included in said networks.

Figures 2, 3:
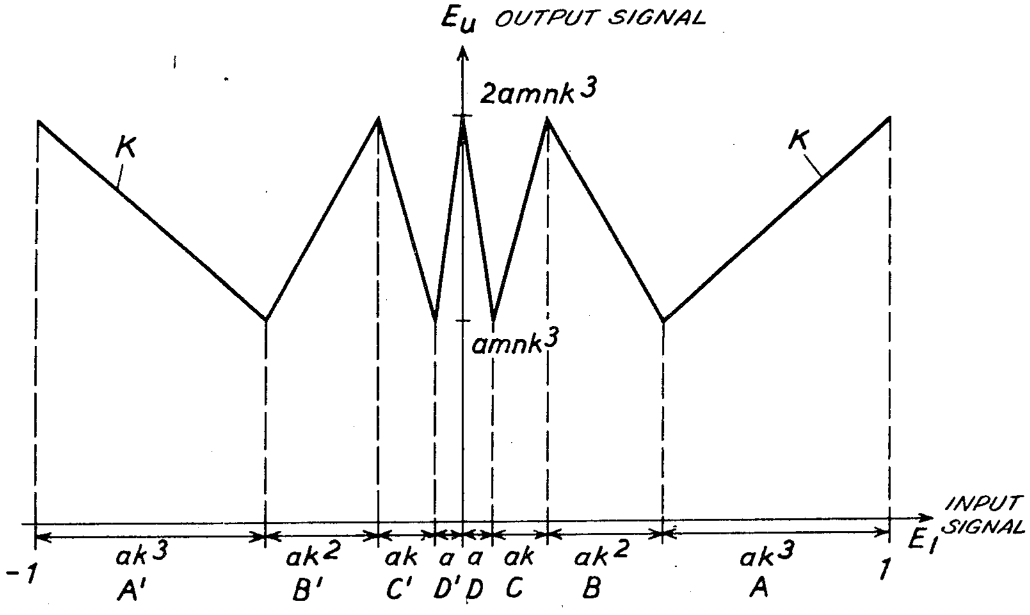

The invention will be described more in detail below with reference to the accompanying drawing, where FIG. 1 shows an example of an arrangement according to the invention, FIG. 2 shows the transfer characteristic of the arrangement according to FIG. 1 and FIG. 3 shows the code obtained from the arrangement according to FIG 1.

In FIG. 1 reference I denotes the input of the arrangement, to which input the analog signal that is to be companded and coded is supplied. A discriminator $D_0$, on the output $d_o$ of which a binary "one" or "zero" is obtained depending on whether its input signal is positive or negative, and a full wave rectifier $L_0$ are connected to the input. The output of the full wave rectifier is connected to one input of a subtracting circuit $S_1$, to the other input of which a direct voltage source $E_1$ is connected. The output of the subtracting circuit is connected partly to a discriminator $D_1$ with an inverting output $d_1$ on which a binary "one" is obtained when the input signal of the discriminator is negative and a "zero" is obtained when the input signal is positive, and partly to two oppositely polarized rectifiers connected rectifiers $L_{1a}$ and $L_{1b}$. The output of the rectifier $L_{1a}$ is connected to one input of a subtracting circuit $S_{2a}$ via an amplifier $F_{1a}$ with the amplification $m$, the other input of the subtracting circuit being connected to a discriminator $D_{2a}$ of the same type as the discriminator $D_1$ and to two oppositely polarized rectifiers $L_{2a}$ and $L_{2b}$ connected in parallel. The rectifier $L_{1b}$ is in a corresponding way, via an amplifier $F_{1b}$ with the amplification $mk^2$, connected to the input of a subtracting circuit $S_{2b}$ to the other input of which a voltage source $E_{2b}$ is connected. The output of circuits $S_{2b}$ is connected to a discriminator $D_{2b}$ of the same type as the discriminator $D_1$, and to two oppositely polarized rectifiers $L_{2c}$ and $L_{2d}$ connected in parallel. The outputs of the discriminators $D_{2a}$ and $D_{2b}$ are connected to one input each of a modulo-2 gate G, the output $d_2$ of which forms the third digital output of the arrangement. Furthermore the rectifiers $L_{2a}$, $L_{2b}$, $L_{2c}$ and $L_{2d}$ are connected to one amplifier each $F_{2a}$, $F_{2b}$, $F_{2c}$ and $F_{2d}$ respectively. The amplifiers $F_{2a}$ and $F_{2c}$ have the amplification $n$ and the amplifiers $F_{2b}$ and $F_{2d}$ have the amplification $kn$. *All the amplifiers are connected to inputs* $r_1$, $r_2$, $r_3$ and $r_4$ respectively of an addition circuit R, the inputs $r_2$ and $r_4$ being inverted. The output of the addition circuit forms the analog output U of the arrangement. At the analog output U a companded signal to be linearly coded in a linear coder LK, known per se, is obtained.

The operation of the arrangement can most easily be explained by means of FIG. 2 which shows the transfer characteristic of the arrangement according to FIG. 1. In FIG. 2 the amplitude range of the input signal $E_I$ is shown on the abscissa, whereby it is presumed that the amplitude range is located between 1 and −1. The amplitude of the output signal $E_u$ is then obtained on the ordinate when a value of the abscissa is projected on the ordinate by means of the curve K. As shown the positive as well as the negative input signal amplitude range is divided into four subranges having the widths $a$, $ak$, $ak^2$ and $ak^3$. When a signal is supplied to the input I in FIG. 1 a "one" or a "zero" is obtained on the digital output $d_o$ depending on whether the signal is positive or negative and the signal is rectified in the rectifier $L_O$. On the output of the rectifier $L_O$ there are consequently always only positive signals. In the subtracting circuit $S_1$ the voltage from the voltage source $E_1$ is subtracted from the signal, said voltage source according to the example being presumed to be $(a+ak)$. If the signal supplied to the subtraction circuit has the value $e_I$ the signal $e_I-(a+ak)$ is thus obtained at the output of the circuit. If it is at first presumed that $e_I>a+k$, i.e., that the signal belongs to one of the ranges A, A′, B or B′, this signal will be positive and so a "zero" is obtained on the digital output $d_1$. The signal is supplied via the rectifier $L_{1a}$ to the amplifier F. The signal $m(e_I-(a+ak))$ is thus supplied to the input of the subtracting circuit $S_{2a}$. The voltage $E_{2a}$, which has been given the value $ak^2m$, is subtracted from this signal, whereby the signal $m(e_I-(a+ak+ak^2))$ is obtained on the output of the circuit. If then $e_I>a+ak+a\,k^2$, which means that the signal belongs to the range A or A′, the output signal will be positive and the signal $nm(e_I(a+ak+ak^2))$, where $n$ constitutes the amplification in the amplifier $F_{2a}$, is supplied to the input $r_1$ of the addition circuit R. Moreover a signal from the voltage source $E_{2b}$, which has been given the value $-ak^3$m, is supplied to the input $r_3$ of the addition circuit via the subtraction circuit $S_{2b}$, the rectifier $L_{2c}$ and the amplifier $F_{2c}$. After the amplification this signal has the value $nmak^3$. On the output of the addition circuit the signal $nm(e_I-(a+a\,k+a\,k^2)+ak^3)$ is thus obtained, which has been indicated by the part of the curve K which is furthest to the right. If, on the other hand, the signal $e_I<a+a\,k+a\,k^2$, i.e., if $e_I$ belongs to the range B or B′ a negative signal is obtained on the output of the subtracting circuit $S_{2a}$, said negative signal being supplied via the rectifier $L_{2b}$ and being amplified by the factor $kn$ in the amplifier $F_{2b}$ and being inverted at the input $r_2$. Thus the signal $-nkm(e_I-(a+ak+ak^2))$ is supplied to the addition circuit and the signal $nmak^3$ is, according to the above, supplied from the input $r_3$, whereby the signal $-nmk(e_I-(a+a\,k+a\,k^2)-ak^2)$ is obtained on the output of the addition circuit, which will be shown in the next part of the curve. If it is instead presumed that the input signal belongs to one of the other ranges C, C′, D or D′, i.e., if the input signal of the subtracting circuit $S_1$ is less that $a+ak$ a negative signal $e_I-(a+ak)$ is obtained on the output of the circuit. This negative signal is supplied, via the rectifier $L_{1b}$, to the amplifier $R_{1b}$, where it is amplified by a factor $mk^2$, whereafter its value is increased by $amk^3$ in the subtracting circuit $S_{2b}$. Consequently the signal $mk^2(e_1-(a+ak))+amk^3=mk^2(e_l-a)$ is obtained on the output of the subtracting circuit. If $e_l>a$, this signal will be positive and supplied via the rectifier $L_{2c}$, where it is amplified by the factor $n$. Thus the signal $nmk^2(e_l-a)$ is obtained at the input $r_3$ of the addition circuit. On the input $r_2$ of the addition circuit the signal $ak^2mnk$ is obtained from the voltage source $E_{2a}$ via the subtracting circuit $S_{2a}$, the rectifier $L_{2b}$ and the amplifier $F_{2b}$, whereby the signal $nmk^2(e_l-a+ak)$ is obtained on the output of the addition circuit, which is represented by the next part of the curve K. If, finally, the signal $e_l<a$, i.e., if it belongs to the ranges D or D', the output signal from the circuit $S_{2b}$ will be negative and supplied via the rectifier $L_{2d}$ to the amplifier $F_{2d}$, where it is amplified by the factor $nk$ and is inverted at the input $r_4$ of the addition circuit, whereby the signal $-mnk^3(e_l-a)$ is supplied to the addition circuit. Furthermore the signal $ak^2mnk$ is like before supplied to the input $r_2$ and so the output signal of the addition circuit will be $-nmk^3(e_l-a-a)$. This is represented by the part of the curve K that is situated closest to the ordinate. Since the signals supplied to the input I will be rectified in the rectifier $L_0$, the curve K will of course be symmetrical around the ordinate. The signals obtained on the output U will then be coded linearly in the coder LK possibly after subtraction of the constant $3/2amnk^3$, the coder being, e.g., of the stage-by-stage type. It should also be pointed out that the factors $mn$, included in the constant $3/2amnk^3$, of which factors $m$ is derived from the two first amplifiers connected in parallel and $n$ from the succeeding four amplifiers, have been included only for the reason that by giving these factors suitable values of the signal will be kept at a suitable level.

The values of the digital outputs $d_o$, $d_1$ and $d_2$ in FIG. 2 obtained from various companding ranges, are shown in FIG. 3, where it is seen that a so-called Gray-code is obtained. Other codes may of course also be obtained thereby that the outputs of the different discriminators are connected together via other suitable logical circuits.

As can be concluded from the example above the companding and coding arrangement according to the invention is composed of a number of successive stages, each stage containing twice as many parallel branches as the previous stage. A signal supplied to the input of the arrangement will then, in dependence on which amplitude range it belongs to, pass through certain branches and then be supplied to a certain input of the addition circuit. The signal supplied to the addition circuit will have been amplified in the amplifiers, through which it has passed and the inclination of the transfer characteristic for a certain input amplitude range will be made up of the product of the amplification factors of these amplifiers. From this it is understood that for obtaining a certain slope for a determined range, the amplification factors of the amplifiers can be determined in different ways, of which from a practical point of view the most advantageous way should be at hand, when the difference between the largest and the smallest amplification factor is as small as possible. Furthermore, by means of suitable amplification factors, it is of course possible to make the slope of a curve segment arbitrarily large in relation to the slope of an adjacent segment. It is also possible to eliminate the inversion shown on every second input of the addition circuit, whereby a continuous transfer characteristic with a positive slope and comprising curve segments is obtained.

We claim:

1. In a pulse code modulation system, an arrangement for companding an analog signal according to a companding curve consisting of a plurality of linear segments wherein the analog signal is divided into a number of subranges within which signals are differently amplified, said arrangement comprising:

an input means including an input for receiving the analog signal and two outputs;

a plurality of subnetworks, each of said subnetworks including an input and an output and further comprising a rectifier and an amplifier serially connected between said input and output thereof, the inputs of a first pair of said subnetworks being connected to said input means, the outputs of a first group of said subnetworks being connected to the inputs of pairs of said subnetworks whereby a binary tree network is formed with a plurality of outputs, the plurality of outputs of said tree network being the outputs of a second group of said subnetworks, the rectifiers in each pair of said subnetworks being oppositely polarized, each of the subnetworks of said first group further comprising a two-input subtracting circuit having a difference output, the first input of each subtracting circuit being connected to the output of the amplifier of the associated subnetwork, the difference output of each subtracting circuit being connected to the output of the associated subnetwork, a different reference voltage source connected to the other input of each of said subtracting circuits, the reference voltages being associated with the line segments of the companding curve, the amplifiers in each of said subnetworks having a different predetermined amplification factor;

a signal addition circuit, said signal addition circuit including a plurality of inputs and an output for transmitting the analog sum of the signals received at said inputs, each of said inputs being connected to a different one of the outputs of the subnetworks of the second group; and output means connected to the output of said addition circuit whereby an analog signal received at said input means is modified in accordance with amplitude levels by the tree network of said subnetworks and said addition circuit and transmitted by said output means as a companded signal.

2. The arrangement of claim 1 and further comprising binary discriminator means connected to the outputs of the subnetworks of said first group for transmitting binary signals in accordance with the polarity of the signal transmitted by the difference outputs of the associated subtraction circuits.

3. The arrangement of claim 2 and further comprising a plurality of signal inverting means, each of said signal inverting means being connected between the output of every second subnetwork of said second group and the associated input of said addition circuit whereby the signals received at the inputs of said addition circuit alternate in polarity.

* * * * *